(12) United States Patent
Genet et al.

(10) Patent No.: US 9,003,597 B2
(45) Date of Patent: *Apr. 14, 2015

(54) WINDSCREEN WIPER DEVICE

(71) Applicant: Federal-Mogul S.A., Aubange (BE)

(72) Inventors: Sophie Genet, Chenieres (FR); Pierre Henin, Bellefontaine (BE); Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/950,615

(22) Filed: Jul. 25, 2013

(65) Prior Publication Data
US 2013/0305477 A1  Nov. 21, 2013

Related U.S. Application Data

(62) Division of application No. 13/718,355, filed on Dec. 18, 2012, now Pat. No. 8,578,583, which is a division of application No. 12/510,476, filed on Jul. 28, 2009, now Pat. No. 8,347,449, which is a division of application No. 10/476,929, filed as application No. PCT/EP02/04656 on May 2, 2002, now Pat. No. 7,581,277.

(30) Foreign Application Priority Data

May 8, 2001  (EP) ...................................... 01201671

(51) Int. Cl.
*B60S 1/38*  (2006.01)

(52) U.S. Cl.
CPC ............... *B60S 1/381* (2013.01); *B60S 1/3879* (2013.01)

(58) Field of Classification Search
CPC ...................................................... B60S 1/381
USPC ........... 15/250.201, 250.43, 250.44, 250.361, 15/250.48, 250.451–250.454, 250.32
See application file for complete search history.

(56) References Cited

U.S. PATENT DOCUMENTS

| 3,088,155 | A  | 5/1963  | Kent          |
|-----------|----|---------|---------------|
| 3,881,214 | A  | 5/1975  | Palu          |
| 5,970,569 | A  | 10/1999 | Merkel et al. |
| 6,279,191 | B1 | 8/2001  | Kotlarski et al. |
| 6,292,974 | B1 | 9/2001  | Merkel et al. |

(Continued)

FOREIGN PATENT DOCUMENTS

| DE | 19729864 A1 | 1/1999 |
| DE | 19734843 A1 | 2/1999 |
| DE | 19736368 A1 | 2/1999 |
| DE | 19856300 A1 | 6/2000 |

(Continued)

*Primary Examiner* — Gary Graham
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of said longitudinal strips are interconnected by a respective connecting piece, which windscreen wiper device comprises a connecting device for an oscillating wiper arm, as well as a spoiler, a special feature of which is that the spoiler as a separate constructional element is detachably connected to the wiper blade.

14 Claims, 3 Drawing Sheets

(56) References Cited

U.S. PATENT DOCUMENTS

| | | |
|---|---|---|
| 6,449,797 B1 | 9/2002 | De Block |
| 6,499,181 B1 | 12/2002 | Kotlarski |
| 6,516,491 B2 | 2/2003 | Merkel et al. |
| 6,523,318 B2 | 2/2003 | Carmel |
| 6,668,419 B1 * | 12/2003 | Kotlarski .................. 15/250.43 |
| 6,944,905 B2 | 9/2005 | De Block et al. |
| 7,228,588 B2 | 6/2007 | Kraemer et al. |
| 8,347,449 B2 * | 1/2013 | Genet et al. .............. 15/250.201 |
| 2002/0000018 A1 | 1/2002 | Kotlarski et al. |
| 2002/0083546 A1 | 7/2002 | Lim |
| 2003/0028990 A1 | 2/2003 | Zimmer |

FOREIGN PATENT DOCUMENTS

| | | |
|---|---|---|
| DE | 10007800 A1 | 8/2001 |
| DE | 10044913 A1 | 12/2001 |
| EP | 1243489 A2 | 9/2002 |
| FR | 2679185 A1 | 1/1993 |
| GB | 2346318 A | 8/2000 |
| WO | WO-9907586 A1 | 2/1999 |
| WO | WO-9910211 A1 | 3/1999 |
| WO | WO-0034090 A1 | 6/2000 |
| WO | WO-0038963 A1 | 7/2000 |
| WO | WO-0149537 A2 | 7/2001 |
| WO | WO-0192073 A1 | 12/2001 |
| WO | WO-02087935 A1 | 11/2002 |

* cited by examiner

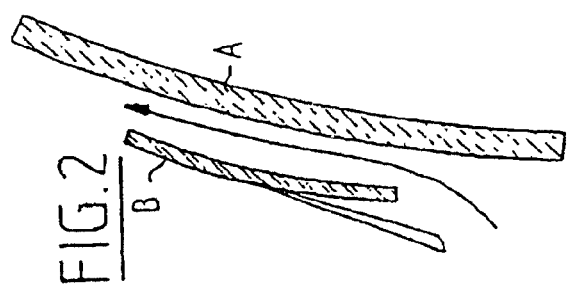
FIG.2
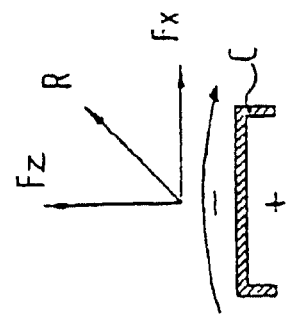
FIG.4
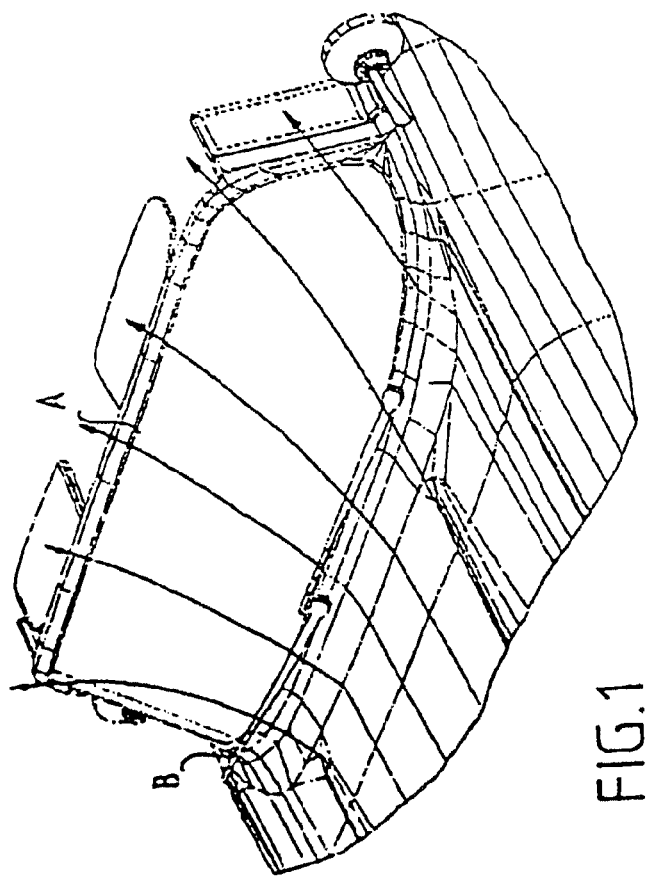
FIG.1
FIG.3

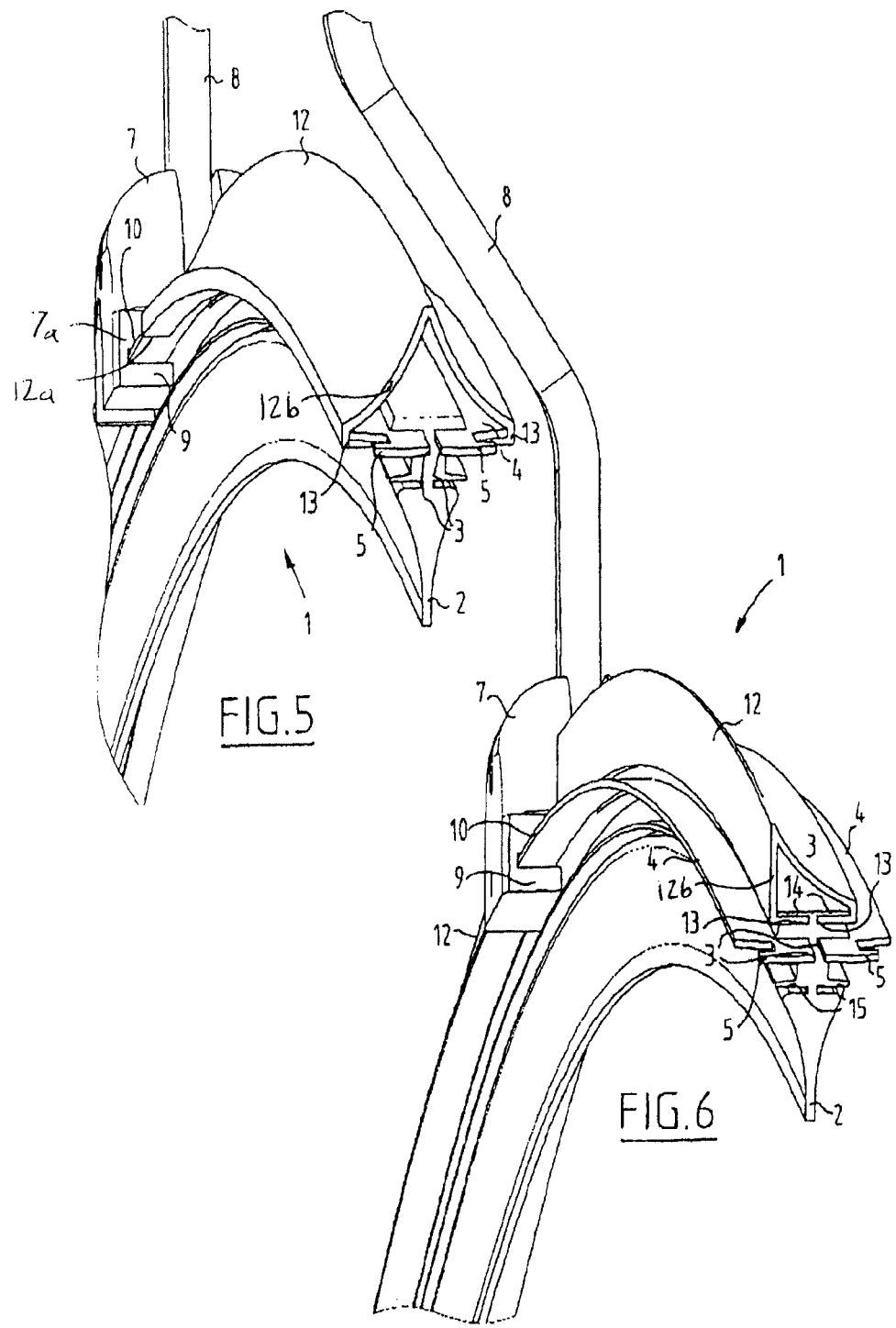

WINDSCREEN WIPER DEVICE

RELATED APPLICATIONS

This application is a divisional application which claims priority to U.S. application Ser. No. 10/476,929, filed Apr. 19, 2004, and U.S. Divisional Application Ser. No. 12/510,476, filed Jul. 28, 2009, and U.S. Divisional application Ser. No. 13/718355, filed Dec. 18, 2012, and is incorporated herein by reference.

STATEMENT REGARDING FEDERALLY SPONSORED RESEARCH

NONE

TECHNICAL FIELD

This invention relates to a windscreen wiper device comprising an elastic, elongated carrier element, as well as an elongated wiper blade of a flexible material, which can be placed in abutment with the windscreen to be wiped, which wiper blade includes opposing longitudinal grooves on its longitudinal sides, in which grooves spaced-apart longitudinal strips of the carrier element are disposed, wherein neighboring ends of said longitudinal strips are interconnected by a respective connecting piece, which windscreen wiper device comprises a connecting device for an oscillating wiper arm, as well as a spoiler. Such a spoiler is also called an "air deflector".

RELATED ART

Such a windscreen wiper device is generally known. The prior art windscreen wiper device is in particular designed as a "yokeless" wiper device, wherein use is no longer made of several yokes pivotally connected to each other, but wherein the wiper blade is biased by the carrier element, as a result of which it exhibits a specific curvature. The spoiler and the wiper blade of the known windscreen wiper device are made in one piece.

Windscreen wiper devices actually used on cars fitted with windscreens exhibiting some degree of curvature are sometimes subjected to a lifting effect at high speeds, which prevents the windscreen from being wiped correctly. This lifting effect is due to the following aerodynamic phenomenon. Streams of air along the car tend to escape vertically upwards along the axis of the car. Near the sides of the curved windscreen, however, the streams of air tend to pass horizontally along the sides. These steams of air create, mainly in the zones in which the windscreen wiper device meets them perpendicularly, a reduced pressure above the windscreen wiper device and an increased pressure between the windscreen and the windscreen wiper device. The resulting pressure, in spite of the mechanical pressure applied by the arm of the windscreen wiper device, causes the latter to lift away towards the front of the windscreen, thereby deteriorating the wiping pattern at higher driving speeds.

A disadvantage of the known windscreen wiper device is that the spoiler and the wiper blade are made in one piece: every car has its own specific aerodynamic characteristics, so that a specific windshield wiper with an integrated spoiler has to be designed and manufacture for each type of car. Obviously this requires the use of complex machinery, tools, with all the expenses involved. A further drawback is that replacement (because of wear) of the wiper blade automatically implies the replacement of the spoiler.

It is an object of the invention to obviate these disadvantages, in the sense that at minimum cost a windshield wiper device comprising a spoiler is proposed which can be mounted on all windshield wipers of different cars, without the use of complex machinery and additional tools being required. It is noted that the present invention is not restricted to windscreen wiper devices for cars, but that it also relates to windscreen wiper devices for rail coaches and all other (fast) vehicles.

SUMMARY OF THE INVENTION

In order to accomplish that objective, a windscreen wiper device of the kind referred to in the introduction is characterized in that the spoiler as a separate constructional element is detachably connected to the wiper blade. In particular said spoiler comprises on opposite sides of the connecting device a subspoiler being detachably connected to the wiper blade. The use of two subspoilers ensures a great rigidity of the spoiler.

In one preferred embodiment of a windscreen wiper device according to the invention, said spoiler comprises clamping means which engage round longitudinal sides of said longitudinal strips that face away from each other. In another preferred embodiment said spoiler comprises clamping means which engage round longitudinal edges of said wiper blade that face away from each other. Preferably said spoiler and said clamping means are made in one piece.

In another preferred embodiment of a windscreen wiper device according to the invention, said connecting pieces are clamping members, which form separate constructional elements. In particular, said connecting pieces are form-locked or force-locked to the adjacent ends of the longitudinal strips.

In another preferred embodiment of a windscreen wiper device according to the invention, said connecting pieces are in one piece with said longitudinal strips.

In another preferred embodiment of a windscreen wiper device according to the invention, at least said longitudinal strips are made of spring band material, preferably steel.

In another preferred embodiment of a windscreen wiper device according to the invention, said connecting device comprises clamping members, which engage round longitudinal sides of said longitudinal strips that face away from each other. In particular, said connecting device and said clamping members are made in one piece.

The invention furthermore relates to a method for manufacturing a windscreen wiper device according to the invention, wherein opposing longitudinal grooves are formed in the longitudinal sides of an elongated wiper blade of a flexible material, which can be placed in abutment with a windscreen to be wiped, in which grooves longitudinal strips of a carrier element are subsequently fitted in spaced-apart relationship, wherein neighboring ends of said longitudinal strips are interconnected by a respective connecting piece, characterized in that a spoiler as a separate constructional element is detachably fitted onto the wiper blade.

THE DRAWINGS

The invention will now be explained in more detail with reference to figures illustrated in a drawing, wherein:

FIG. 1 shows diagrammatically the flow of streams of air along the windscreen of a car;

FIG. 2 is a diagram of a standard windscreen wiper device in a position parallel to the streams of air;

FIG. 3 is a cross-section of the same windscreen wiper device, but in a position at right angles to the streams of air;

FIG. 4 illustrates the forces due to the tangential streams of air acting on the standard windscreen wiper blade;

FIGS. 5 and 6 show a schematical and a perspective view, respectively, of a windscreen wiper device according to two preferred embodiments of the invention.

DETAILED DESCRIPTION

Figure 7:
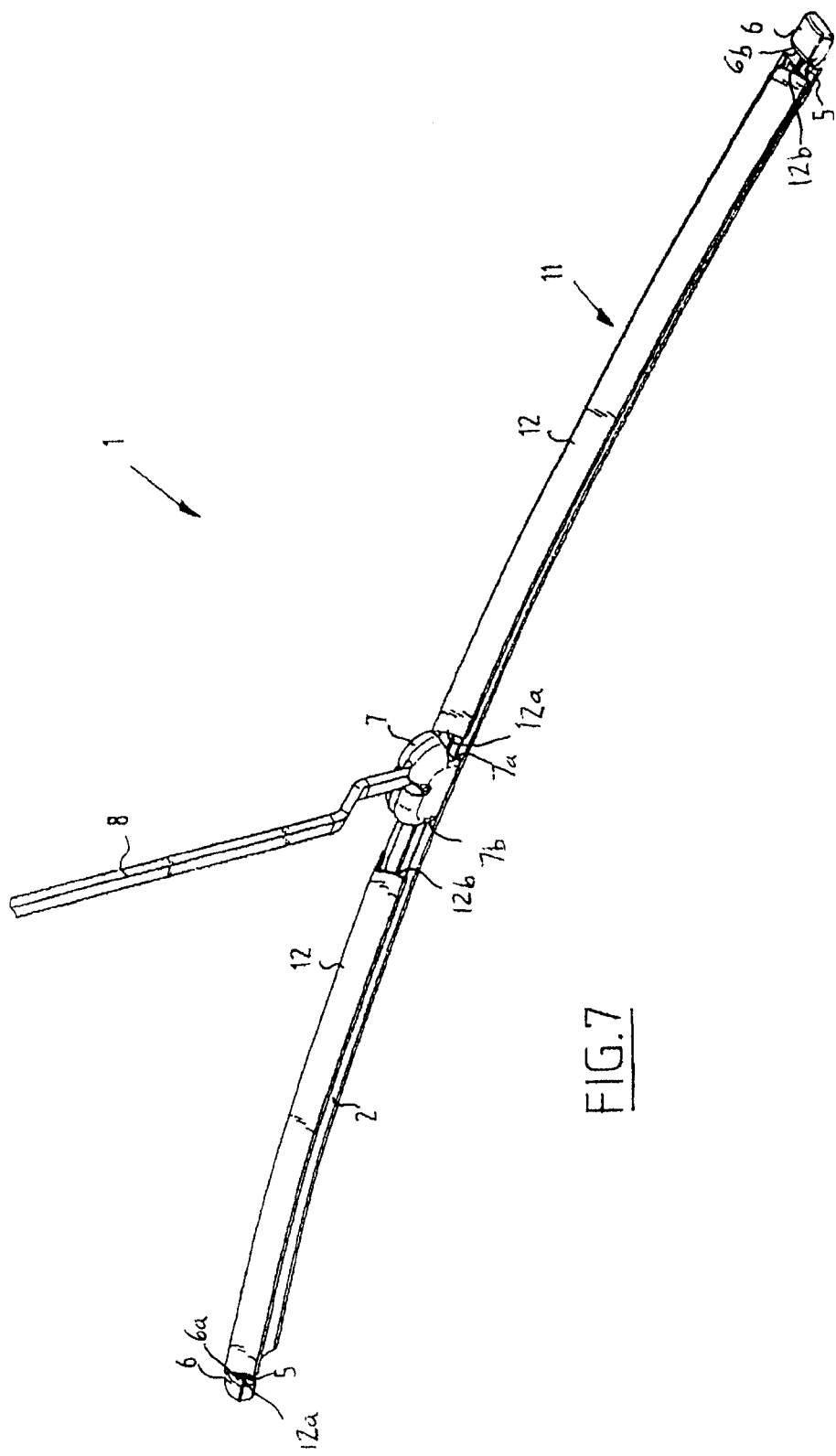
FIG. 7 is a total perspective, schematic view of the windscreen wiper device of FIGS. 5 and 6.

FIG. 1 shows a perspective view of the front portion of a car provided with a curved windscreen A, together with the direction of flow of the streams of air, the latter passing the vehicle upwards and along the sides. In a zone in which a windscreen wiper device of the usual standard form is positioned parallel to the streams of air, as shown in FIG. 2, nothing unusual occurs; on the other hand, in a zone as shown in FIG. 3, in which the streams of air flow practically at right angles to the direction of the windscreen wiper device, this air cannot flow along the glass because of the wiper blade, and thus creates an increase in pressure (indicated by the + sign). Such an increased pressure also exists in the region of the hollow profile comprised between the flanges of the frame C directed towards the windscreen. These flanges create further obstacles to the flow of air and assist in maintaining the increased pressure. In addition, the streams of air which pass round the windscreen wiper device towards the upstream side tend to move away from the surface and create a reduced pressure zone (indicated by the − sign), as is well known. These two forces Fx and Fz (which can be compared with the drag and the lift acting on a wing section) have a resultant R which tends to lift the windscreen wiper device against the mechanical pressure applied by the arm (see FIG. 4).

FIGS. 5 and 6 show a preferred variant of a windscreen wiper device 1 according to the invention. Said windscreen wiper device is built up of an elastomeric wiper blade 2, in the longitudinal sides of which opposing longitudinal grooves 3 are formed, and of longitudinal strips 4 made of spring band steel, which are fitted in said longitudinal grooves 3. Said strips 4 form a flexible carrier element or carrier for the rubber wiper blade 2, as it were, which is thus biased in a curved position (the curvature in operative position being that of a windscreen to be wiped). Neighboring ends 5 of strips 4 are interconnected on either side of the windscreen wiper device 1 by means of connecting pieces 6 functioning as clamping members. In this embodiment, the connecting pieces 6 are separate constructional elements or end caps, which may be form-locked as well as force-locked to the ends 5 of strips 4. In another preferred variant, said connecting pieces 6 are in one piece with the strips 4 made of spring band steel. In the latter case said connecting pieces form transverse bridges for the strips 4, as it were.

The windscreen wiper device 1 is further more built up of a connecting device 7 of plastic material for an oscillating wiper arm 8. Connecting device 7 comprises clamping members 9 that are integral therewith, which engage round longitudinal sides 10 of the strips 4 that face away from each other, as a result of which the connecting device 7 is firmly attached to the unit consisting of wiper blade 2 and strips 4. The oscillating wiper arm 8 is pivotally connected to the connecting device 7 about a pivot axis near one end.

Both preferred embodiments of FIGS. 5 and 6 according to the invention comprise a spoiler 11 including two separate subspoilers 12 being detachably connected to the wiper blade 2 on opposite sides of the connecting device 7. The subspoilers 12 are made of an elastomeric material, rubber for example, and they are provided with clamping means 13 made in one piece therewith. In the preferred embodiment of FIG. 5 the clamping means 13 engage round longitudinal sides 10 of the longitudinal strips 4 that face away from each other, whereas in the embodiment of FIG. 6 the clamping means 13 engage around longitudinal laterally extending edges 14 of the wiper blade 2 that face away from each other. Of course, it is also possible for the clamping means to engage round other longitudinal laterally extending edges 15 of the wiper blade 2 that face away from each other.

FIG. 7 shows a total perspective, schematic view of the windscreen wiper device of FIGS. 5 and 6, wherein corresponding parts have been designated with the same reference numerals.

It will be seen from FIGS. 5-7 that the connecting device 7 is secured to the carrier 4 at a location spaced between the end caps 6. The connecting device has longitudinally oppositely facing abutment surfaces 7a and 7b, and the end caps 6 have longitudinally inwardly facing abutment surfaces 6a, 6b that face toward and are spaced from the abutment surfaces 7b, 7a of the connecting device 7, respectfully, and which define a longitudinal space of predetermined length between the connecting device abutment surfaces 7b, 7a and each of the respective end cap abutment surfaces 6a and 6b.

The subspoilers 12 span at least the majority of the length of the space and thus at least substantially span the longitudinal space between the abutment surfaces of the connecting device 7 and end caps 6. The subspoilers 12 each have abutment surfaces 12a, 12b at their opposite ends that are adjacent to and directly face (i.e., are positioned so they would confront) the abutment surfaces of the connecting device and end caps, respectfully, but which are spaced longitudinally from the associated abutment surfaces of the connecting device 7 and end caps 6, as shown in FIGS. 5 and 6 and best illustrated in FIG. 7, by virtue of the subspoilers 12 being shorter in length between their abutment surfaces 12a, 12b than the longitudinal spacing between the abutment surfaces 7a, 6b and 7b, 6a of the connecting device and end caps 6. The spacing between the subspoilers 12 and the abutment surfaces 6a, 6b and 7a, 7b of the end caps 6 and connecting device 7, along with the detachable (i.e., not fixedly attached) subspoiler connection, allow the subspoilers 12 to flex and move with the changing bending curvature of the wiper assembly, as illustrated by a comparison for FIG. 7 and FIGS. 5 and 6.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A windscreen wiper device, comprising:
a longitudinally extending wiper blade of flexible rubber material;
a carrier supporting said wiper blade and made of spring steel material that is bent in a longitudinal direction of said carrier and which elastically biases said wiper blade to a curved shape, said carrier having side edge portions which project laterally outwardly of said wiper blade;
a connecting device disposed on said carrier and adapted for connection with a wiper arm of a vehicle;
end caps disposed at opposite ends of said carrier in longitudinal spaced relation to said connecting device;
a flexible spoiler made as a separate piece from that of said wiper blade and said carrier, said spoiler engaging said projecting side edge portions of said carrier and substantially spanning the space between said connecting device and said end caps, and said spoiler flexibly conforming to said curved shape imparted by said carrier.

2. The windscreen wiper device of claim 1, wherein said spoiler is slidable.

3. The windscreen wiper device of claim 1, wherein said spoiler comprises subspoiler portions.

4. The windscreen wiper device of claim 1, wherein said carrier is made from two strips of spring steel received in associated side grooves of said wiper blade.

5. The windscreen wiper device of claim 1, wherein said spoiler is made of rubber.

6. The windscreen wiper device of claim 1, wherein said spoiler is detachable from said side edge portions.

7. The windscreen wiper device of claim 1, wherein said spoiler wraps around said projecting side edge portions.

8. The windscreen wiper device of claim 1, wherein said spoiler is generally triangular in cross-section.

9. The windscreen wiper device of claim 8, wherein said spoiler is generally hollow on an interior thereof.

10. The windscreen wiper device of claim 8, wherein a mid portion of said triangular shaped spoiler projects above said carrier and opposite side portions wrap about said projecting side edge portions of said carrier.

11. The windscreen wiper device of claim 1, wherein said connecting device is made of plastic.

12. The windscreen wiper device of claim 1, wherein said end caps are force locked onto said carrier.

13. The windscreen wiper device of claim 1, wherein said carrier comprises two strips of spring band material joined at their opposite longitudinal ends by said end caps and joined intermediate their opposite ends by said connecting device.

14. The windscreen wiper device of claim 1, including a wiper arm connectable to said connecting device.

\* \* \* \* \*